W. A. FOX.
EGG TESTER.
APPLICATION FILED MAR. 29, 1915.
1,174,841.
Patented Mar. 7, 1916.
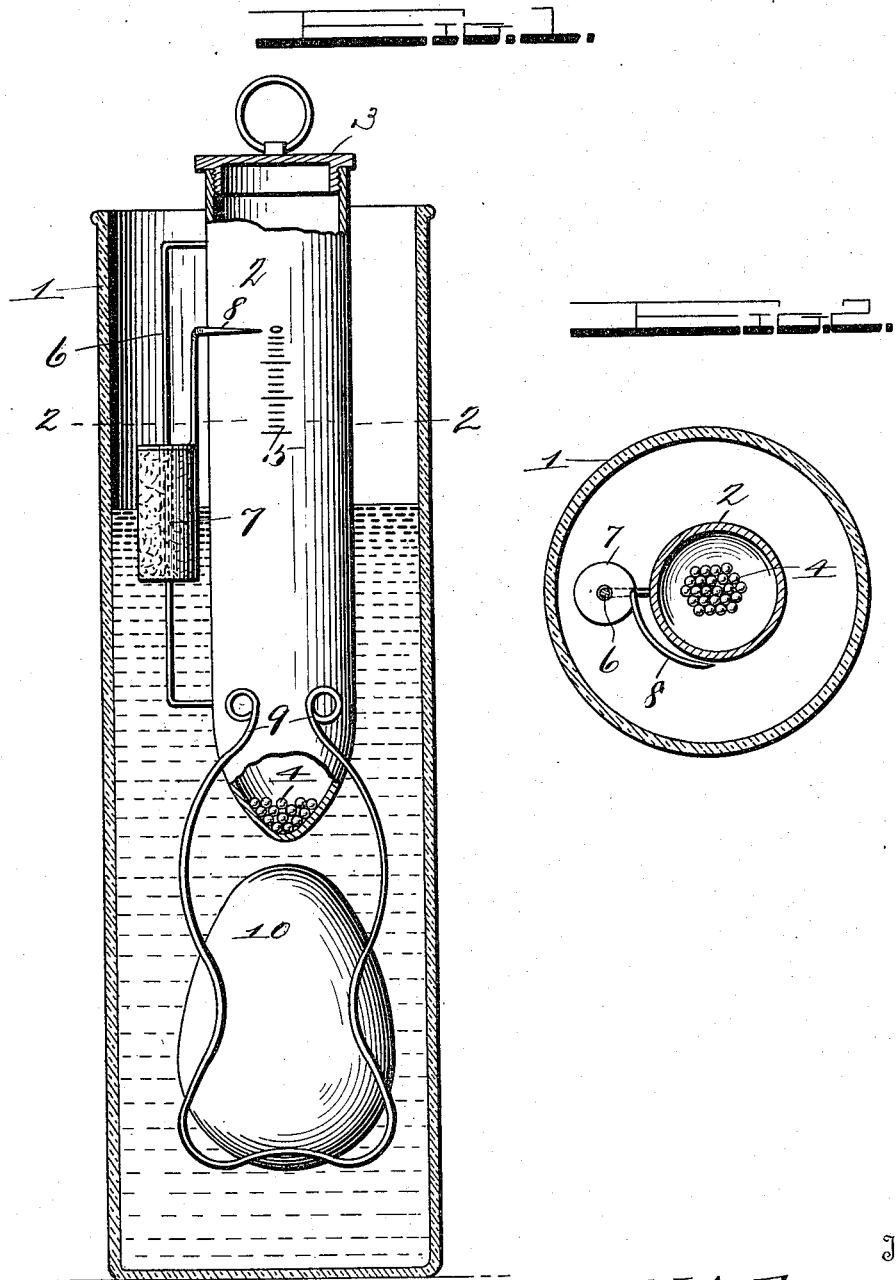
Witnesses
Chas. L. Griesbauer.
E. B. McBath
Inventor
W. A. Fox,
By Chas. E. Brock
Attorney

UNITED STATES PATENT OFFICE.

WILLIAM A. FOX, OF GREELEY, KANSAS.

EGG-TESTER.

1,174,841.

Specification of Letters Patent.

Patented Mar. 7, 1916.

Application filed March 29, 1915. Serial No. 17,703.

*To all whom it may concern:*

Be it known that I, WILLIAM A. FOX, a citizen of the United States, residing at Greeley, in the county of Anderson and the State of Kansas, have invented a new and useful Improvement in Egg-Testers, of which the following is a specification.

It is a well known fact that a fresh egg has a definite specific gravity which changes day by day, and it is common practice to place eggs in a salt solution, of say 1.05 specific gravity and if it sinks to the bottom it is considered a fresh egg. It will, if not fresh rise to or remain near the surface. This is, however, merely a rough way of determining whether the egg is or is not newly laid, and its age is a matter of guesswork. The more common practice is to candle the egg, the age of the egg being judged from the appearance or condition of its interior. While this is effective in eggs of thin shell texture or those perfectly white, it is slow and uncertain in the case of thick shelled eggs of a brownish tint, while in the case of dark brownish or reddish eggs of thick shells, it is in some cases impossible to light the interior through the shell so as to form any idea of degrees of freshness, and even in testing incubator eggs by means of a light, it is frequently hard to judge the condition of an egg of this type even after eight or ten days incubation.

According to Leppig the specific gravity of a fresh egg is not less than 1.06 grams and it loses 0.0017 gram per day in the open air. My invention takes advantage of this fact and provides accurate means for measuring the specific gravity of an egg thereby not only determining whether the egg is or is not fresh, but determining approximately the age of eggs which have been kept under normal, average conditions.

The invention consists of the novel features of construction hereinafter described, pointed out in the claims, and shown in the accompanying drawings in which:—

Figure 1 is a side elevation, parts being in section. Fig. 2 is a section on the line 2—2 of Fig. 1.

In the drawings 1 represents a vessel preferably of glass, and if desired an ordinary glass jar may be employed.

A cigar-shaped float 2 is provided having a removable cap 3 at the upper end, and weights, in the form of small shot, 4, rest in the lower conical end of the tube. On the side of the tube is arranged vertically a scale 5. On one side the tube carries a vertically arranged bracket 6 and on the bracket works loosely a float 7. The float 7 carries an index or pointer 8 that works on the scale 5. Spring clamps 9 formed of wire depending from the lower end of the tube or float 2, being shaped to receive and hold an egg 10.

In operation the float 2 is weighted so that a perfectly fresh egg when placed in the wire carrier 9 will cause the float 2 to sink sufficiently in the liquid contained in the vessel 1 to bring the pointer 8 to the zero mark on the scale 5. When so regulated an egg not fresh will sink the float 2 to a less depth, and the position on the scale 5 of the pointer will not only show the degree of freshness of the egg, but when used with eggs kept under normal conditions will indicate the age in days of the egg, and when eggs have been preserved or kept in cold storage it will indicate their relative freshness, that is an egg preserved in salt or water glass and one kept in cold storage may be in a condition equal to that of an egg kept under normal condition and ten or twelve days of age. As an egg four or five days old would be considered a fresh egg from a commercial standpoint a scale the graduations of which indicates periods of weeks would be sufficient for commercial purposes, as will be obvious to those dealing in products of this kind.

What I claim is:—

1. An egg tester comprising a tubular float, having a vertically arranged scale thereon, a vertically arranged bracket carried by the float, a second float working on said bracket, a pointer carried by the second float and working over said scale, and means carried by the first float for holding an egg.

2. An egg tester comprising a cigar-shaped float, a removable cap at the upper end, a weight carried within the float at its lower end, an egg carrier depending from the lower portion of the float, a scale arranged on the float, a bracket carried by one side of the float and occupying a vertical position when the device is in use, a second float freely movable on said bracket, and a pointer carried by the second mentioned float and working over the scale of the first mentioned float.

WILLIAM A. FOX.

Witnesses:
W. W. PARKER,
L. T. MARKEY.

Copies of this patent may be obtained for five cents each, by addressing the "Commissioner of Patents, Washington, D. C."